Oct. 12, 1954
C. U. BAIZE
2,691,182
TRIPLE ACTION SPIRAL TOOTHBRUSH
Filed Oct. 26, 1951
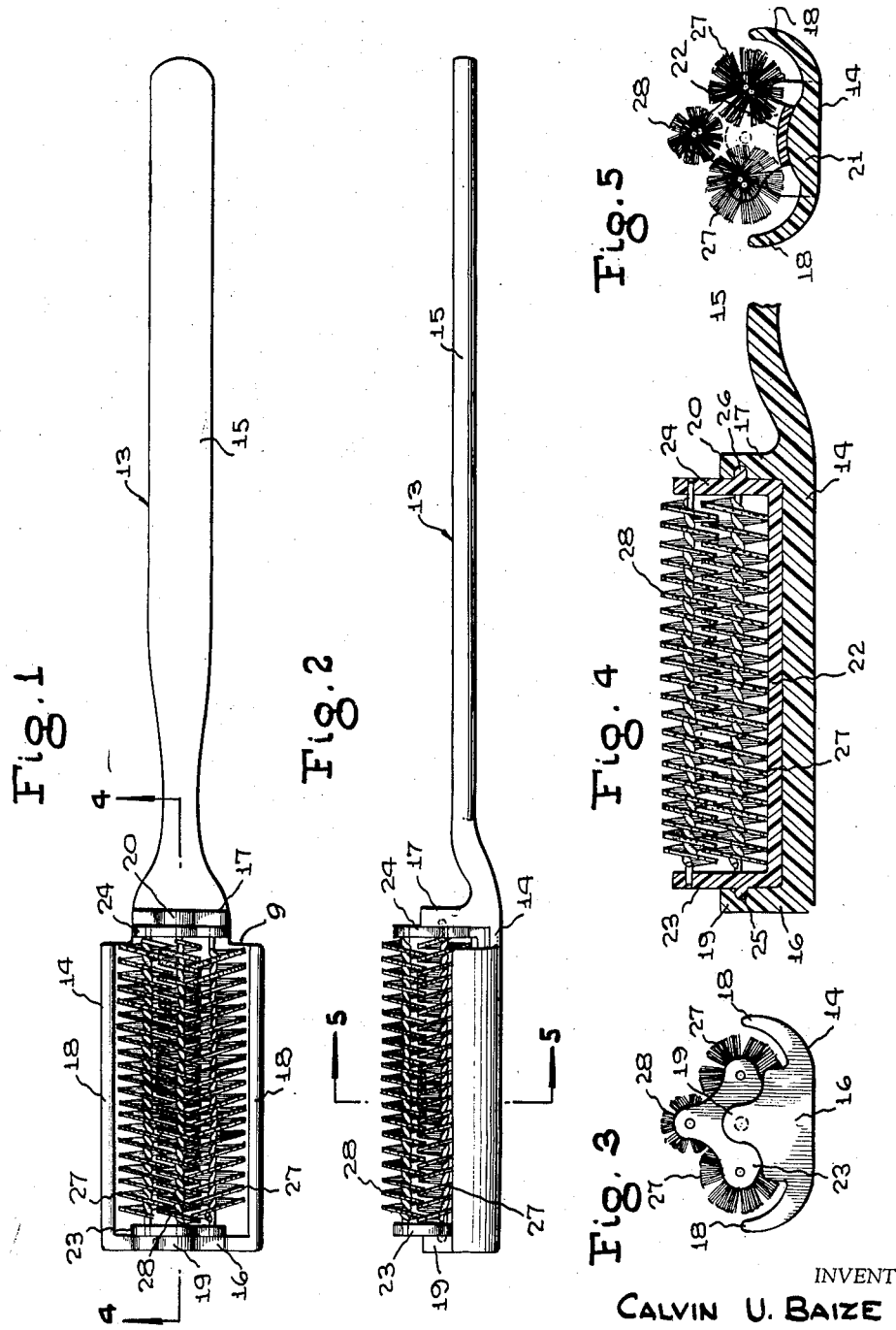
INVENTOR
CALVIN U. BAIZE
BY
McMorrow, Berman + Davidson
ATTORNEYS Patented Oct. 12, 1954

2,691,182

UNITED STATES PATENT OFFICE 2,691,182

TRIPLE ACTION SPIRAL TOOTHBRUSH

Calvin U. Baize, Gatesville, Tex.

Application October 26, 1951, Serial No. 253,320

2 Claims. (Cl. 15—27)

This invention relates to dental implements, and more particularly to an improved tooth brushing and gum massaging device.

A main object of the invention is to provide an improved dental implement which is useful for cleaning and massaging the teeth, said implement being simple in construction, being easy to assemble, and providing efficient cleaning and massaging of the teeth and gums of the user.

Further objects and advantages of the invention will become apparent from the following description and claims, and from the accompanying drawings, wherein:

Figure 1 is a top plan view of one form of an improved dental implement constructed in accordance with the present invention.

Figure 2 is a side elevational view of the dental implement shown in Figure 1.

Figure 3 is an enlarged end elevational view of the dental implement of Figures 1 and 2.

Figure 4 is an enlarged longitudinal cross sectional detail view taken on the line 4—4 of Figure 1.

Figure 5 is an enlarged transverse vertical cross sectional view taken on the line 5—5 of Figure 2.

Referring to the drawings, and more particularly to Figures 1 to 5, the dental implement is designated generally at 13 and comprises a trough or hollow main body 14 open at its top and made of flexible plastic material, or the like, and an elongated handle 15 extending longitudinally from one end of the main body 14. The main body or trough 14 is formed with a pair of longitudinally spaced, transversely extending abutments or end walls 16 and 17 and with the longitudinal arcuately curved side walls 18, 18. As will be seen from Figures 1 and 2, the side walls 18, 18 merge with the transverse abutment 16, and terminate a short distance from the transverse abutment 17. This allows greater flexibility for the portion of the main body 14 between the transverse abutment 17 and the ends of the side walls 18, 18, whereby the main body may be flexed to vary the spacing between abutments 16 and 17 for the purpose of inserting and removing the working elements of the implement, as will be subsequently described. Further, the space between the abutment 17 and the adjacent ends of the side walls 18, 18 provides a discharge opening 9 from the trough or main body 14, for draining the trough.

The transverse abutments 16 and 17 are formed respectively with the upstanding central lug elements 19 and 20. Designated at 21 is the longitudinally extending convex central rib formed in the concave receptacle defined by the side walls 18, 18 and the transverse wall elements 16 and 17 on the main body 14. Designated at 22 is a support member shaped to fit longitudinally in the main body 14 in engagement with the inner surfaces of the abutments 16 and 17 and with the convex surface of the rib 21. As shown in Figure 4, the support member 22 is provided with the end walls 23 and 24 which are adapted to respectively engage the abutments 16 and 17, said end walls 23 and 24 being formed with the respective outwardly projecting lugs 25 and 26 adapted to lockingly engage in respective recesses formed in the lug elements 19 and 20 to secure the support element 22 in the main body 14. The insertion and removal of the support element 22 may be accomplished by flexing the main body 14, as above described, to separate the lug elements 19 and 20 and to thereby provide clearance for the engagement or disengagement of the lugs 25 and 26 in the recesses provided therefor in the lug elements 19 and 20.

Journaled or supported in the end walls 23 and 24 of the support member 22 for rotation about axes lying in a plane parallel to and spaced above the handle 15 and rib 21 are the respective longitudinally extending spiral brushes 27, 27 and 28. The spiral brushes 27, 27 are located symmetrically on opposite sides of the longitudinal center line of the support member 22 and project above the plane of the top edges of the side walls 18, 18, as shown in Figure 2. The spiral brush 28 is located in the longitudinal vertical central plane of the support member 22 and is spaced substantially above the side brushes 27, 27, as shown in Figure 2.

In using the implement, the device is held as an ordinary toothbrush and is manipulated in the same manner, being moved longitudinally back and forth. The middle spiral brush 28 is disposed between the upper and lower teeth, cleaning the chewing surfaces of the upper and lower teeth, while the two lateral spiral brushes 27, 27 clean the lateral surfaces of both upper and lower teeth.

The support member 22 is made of substantially rigid material, such as relatively rigid plastic material so that the longitudinal spiral brushes are securely retained in the support member while being allowed to freely rotate therein. The material of the main body 14 is substantially more resilient than that of the support member 22, whereby the support member may be readily inserted or removed from the main body 14, in the manner above described.

While certain specific embodiments of an improved dental implement have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A dental implement comprising a trough having one end open and the other end closed, a handle projecting from the open end of said trough, an abutment extending transversely of said handle and secured thereto adjacent to and spaced from said open end of said trough, the space between the open end of said trough and the abutment providing a discharge opening from said trough, a rib projecting from and extending longitudinally along the mid-portion of the internal face of the trough bottom, a support positioned longitudinally of and substantially within said trough and removably supported on said trough and said abutment, said support having a portion conformably shaped to fit and receive said rib, and at least two spaced brushes positioned longitudinally within and mounted on said support for rotation about axes arranged on opposite sides of the mid-portion of said rib and parallel to and spaced above said rib, each of said brushes having a peripheral portion projecting above the open top of said trough.

2. A dental implement comprising a trough having one end open and the other end closed, a handle projecting from the open end of said trough, an abutment extending transversely of said handle and secured thereto adjacent to and spaced from said open end of said trough, the space between the open end of said trough and the abutment providing a discharge opening from said trough, a rib projecting from and extending longitudinally along the mid-portion of the internal face of the trough bottom, a support positioned longitudinally of and substantially within said trough and removably supported on said trough and said abutment, said support having a portion conformably shaped to fit and receive said rib, a pair of spaced brushes positioned longitudinally within and mounted on said support for rotation about axes arranged on opposite sides of the mid-portion of said rib and parallel to and spaced above said rib, each of said brushes having a peripheral portion projecting above the open top of said trough, and another brush positioned longitudinally between and above said pair of brushes and mounted on said support for rotation about an axis parallel to the axes of said pair of brushes.

References Cited in the file of this patent

UNITED STATES PATENTS

| Number | Name | Date |
|---|---|---|
| 1,254,532 | Paul | Jan. 22, 1918 |
| 1,717,125 | Spitz | June 11, 1929 |
| 1,901,503 | Fessenden | Mar. 14, 1933 |
| 2,183,139 | Hertzberg | Dec. 12, 1939 |
| 2,285,865 | Lowe et al. | June 9, 1942 |
| 2,435,421 | Blair | Feb. 3, 1948 |
| 2,583,886 | Schlegel | Jan. 29, 1952 |
| 2,628,377 | Cockriel | Feb. 17, 1953 |
| 2,662,238 | Robey | Dec. 15, 1953 |

FOREIGN PATENTS

| Number | Country | Date |
|---|---|---|
| 168,085 | Switzerland | June 1, 1934 |